R. GRACE.
CHUCK.
APPLICATION FILED SEPT. 27, 1920.
1,413,330.
Patented Apr. 18, 1922.
2 SHEETS—SHEET 1.
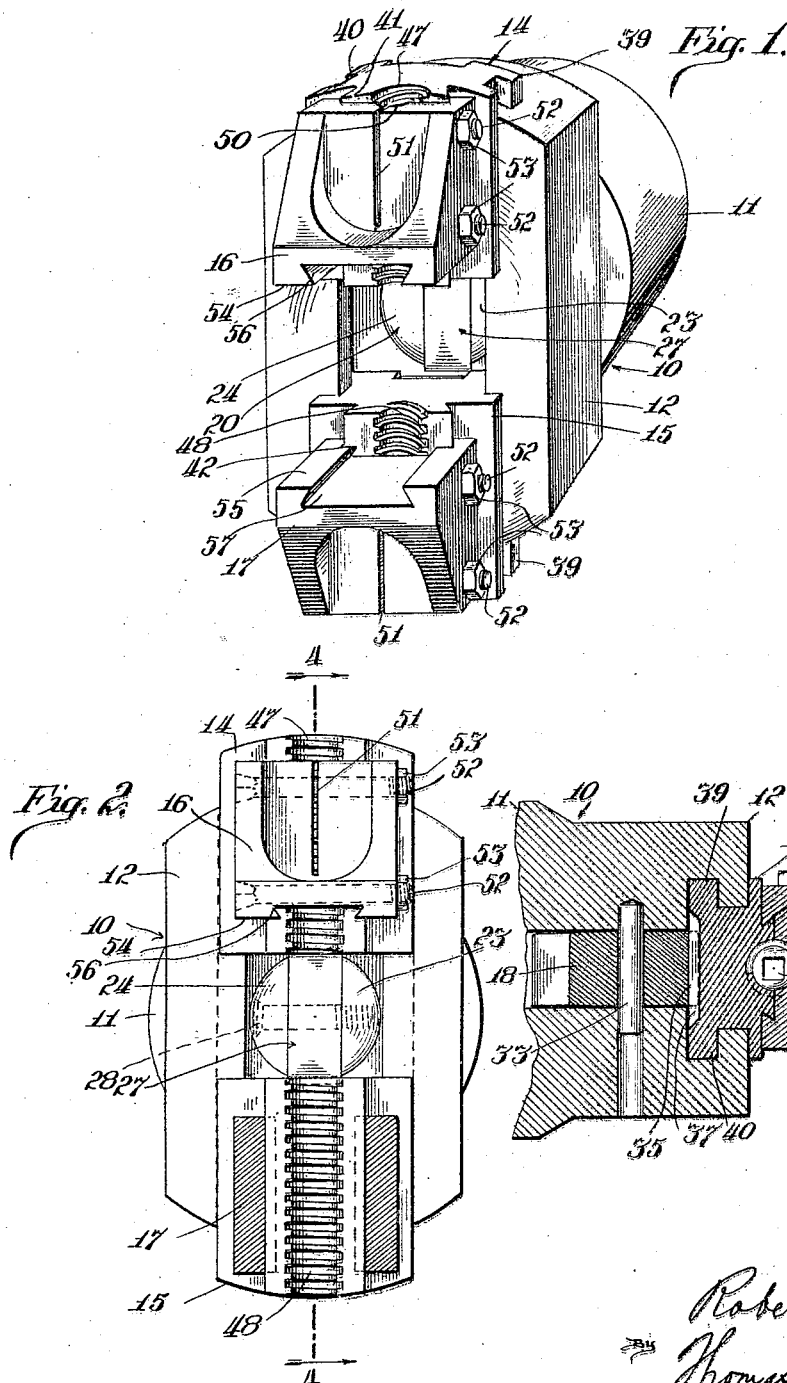
Inventor
Robert Grace
By Thomas H. Ferguson
Attorney R. GRACE.
CHUCK.
APPLICATION FILED SEPT. 27, 1920.
1,413,330.
Patented Apr. 18, 1922.
2 SHEETS—SHEET 2.
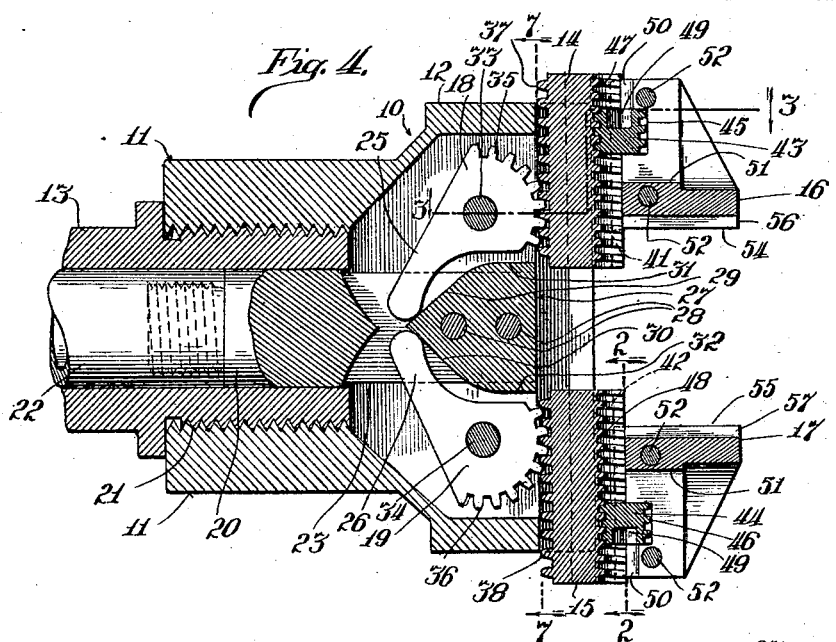
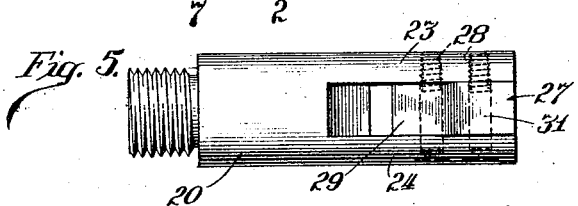
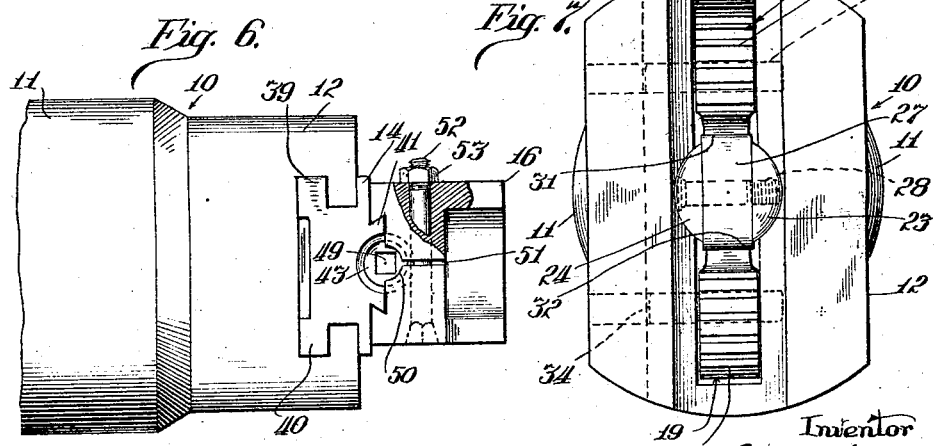
Inventor
Robert Grace
By Thomas H. Ferguson
Attorney

UNITED STATES PATENT OFFICE.

ROBERT GRACE, OF DETROIT, MICHIGAN.

CHUCK.

1,413,330.

Specification of Letters Patent. Patented Apr. 18, 1922.

Application filed September 27, 1920. Serial No. 413,139.

*To all whom it may concern:*

Be it known that I, ROBERT GRACE, a citizen of the United States, residing at Detroit, in the county of Wayne, State of Michigan, have invented certain new and useful Improvements in Chucks, of which the following is a specification.

The present invention relates to chucks and the principal object of the invention is to provide a simple and economical chuck which may be quickly adjusted and operated. To this end I employ two jaws which are mounted to reciprocate in the head of the chuck. One feature of the invention is the novel mechanism by which these jaws are moved to and fro. In the specific form illustrated, toothed racks and toothed segments co-operate with cam surfaces on a longitudinally reciprocating member to actuate these jaws. Preferably the jaw structure is a combination of master jaws and work engaging jaws which are adjustable on the master jaws. Another feature of the invention is the novel means for adjusting these work engaging jaws upon the master jaws. In the form illustrated adjusting screws working in sockets in the adjustable jaws and upon threads in the master jaws, perform this function. A slot in each of the adjusting jaws is used with a locking bolt to lock the adjusting screw against movement when once set. These and other features of my invention will be more fully understood upon reference to the following detailed description taken in connection with the accompanying drawings, and the scope of the invention will be particularly pointed out in the appended claim.

In said drawings, Fig. 1 is a perspective view of a chuck constructed in accordance with the present invention; Fig. 2 is a front elevation of the same, the lower jaw being shown in section taken on a plane indicated by the line 2—2 of Fig. 4; Fig. 3 is a horizontal longitudinal section of the same taken on a plane indicated by the line 3—3 of Fig. 4; Fig. 4 is a central vertical longitudinal section of the same; Fig. 5 is a view illustrating the reciprocating member by which the chuck jaws are operated; Fig. 6 is a top view of the chuck showing a portion of one of the work engaging jaws broken away and Fig. 7 is a transverse section of the chuck taken on a plane indicated by the line 7—7 of Fig. 4. Throughout these views like characters refer to like parts.

Referring to the drawings in detail, 10 designates the head of the chuck which includes a cylindrical portion 11 and an elongated portion 12. The portion 11 is fitted upon the spindle 13 of the lathe or other machine to which the chuck is to be applied and the elongated portion 12 carries the master jaws 14 and 15 which are respectively provided with work engaging jaws 16 and 17. The head 10 is hollowed out so as to provide space for the toothed segments 18 and 19 and the reciprocating member 20 by which the jaws of the chuck are actuated. The head may be secured to the spindle 13 in any desired way and in the instance illustrated, threads 21 upon the exterior of the spindle perform this function. The reciprocating member 20 is preferably secured to a longitudinally movable member 22 which passes lengthwise through the spindle 13 and may be moved back and forth by hand or in any other desired way. The forward end of the reciprocating member 20 is slotted so as to provide the portions 23 and 24. The rear end of the slot may be given any suitable shape but it must be such as not to interfere with the arms 25 and 26 upon the toothed segments 18 and 19 respectively. Between the portions 23 and 24 I have located a cam member 27. Rivets 28 passing through the portions 23 and 24 and intervening member 27 serve to hold the parts together. The cam member 27 is provided with a V-shaped inner end having the forwardly diverging cam faces 29 and 30. These diverging faces terminate in substantially parallel cam faces 31 and 32 respectively. These cam faces co-operate with the rounded ends of the arms 25 and 26 of the toothed segments. From this description it will be seen that when the member 20 is drawn to the rear the arms 25 and 26 will be forced apart and the segments 18 and 19 will be rotated upon their pivots 33 and 34 respectively. As this movement continues the rounded ends of the arms 25 and 26 will pass into engagement with the parallel cam faces 31 and 32 and thus hold the toothed segments in one extreme position. These parallel cam faces thus serve to lock the segments in their clamping positions. A movement of the member 20 in the opposite direction allows the arms 25 and 26 to be moved into the slot between the portions 23 and 24. The forward end of the cam member 27 being of greater width than the interior diameter of the spindle 13 engages the latter to limit the rearward movement of the member 22. This engagement however does not occur until after the ends of the arms 25 and 26 pass into engagement with the parallel locking faces 31 and 32 respectively. As clearly illustrated in Fig. 3, the pivot pins 33 and 34 are driven into holes drilled into the head and pass through openings in the toothed segments. In this way these pins serve as pivots for the segments. It may also be noted that the cavities in the head 10 in which the segments 18 and 19 are located and the slot in the forward end of the reciprocating member 20 are in alignment and of the same width. Consequently the cam member 27, which is of like width, passes beyond the confines of the slot in the reciprocating member into the cavities in the head and by engaging the walls of the latter prevents rotation of the reciprocating member and thus insures alignment of the slot and cavities and proper operation of the segments.

The segments 18 and 19 are provided with teeth 35 and 36 which are located upon arcs concentric with the pivots of the segments. These teeth co-operate respectively with teeth 37 and 38 located upon the backs of the master jaws 14 and 15 respectively. Because of the engagement of these teeth it will be seen that as the segments are rotated the master jaws are moved toward and from each other in accordance with the direction of rotation of the segments. These jaws are provided in each instance with tongues 39 and 40 which travel in grooves in the elongated portion 12 of the head 10. Because of this construction the jaws are free to move toward and from each other in the guideways thus formed but cannot be drawn outwardly away from the head.

These master jaws 14 and 15 are not intended to engage the work but carry respectively the work engaging jaws 16 and 17. The forward faces of the master jaws 14 and 15 are provided with dovetails 41 and 42 respectively which engage corresponding dovetail slots in the adjustable jaws 16 and 17. This construction allows the adjustable jaws to be moved toward and from each other upon the master jaws. The adjustable jaws are given their adjustment by means of adjusting screws 43 and 44. These screws turn freely in sockets 45 and 46 formed in the rear faces of the adjustable jaws 16 and 17 respectively. These same screws have their threads engaging with threads 47 and 48 formed upon the forward faces of the master jaws 14 and 15. In each instance the adjusting screw is provided with a socket 49 which may be square or otherwise angular in cross-section. By means of a suitable key which enters this socket the screw may be turned any desired amount. It will be seen that the rear face of each of the adjustable jaws is cut away at 50 so as to provide space for the passage of this key or tool. It will be noted that as the screws are turned they will travel along the threads upon the master jaws and will carry the adjustable jaws with them. In order to hold the parts in any adjusted position the portions of the adjustable jaws which are adjacent to the screws are made yielding so that they may be pressed into tight engagement with the screws to hold them against rotation. This is done in each instance by providing that portion of the adjustable jaw which lies nearest to the master jaws with a slit 51 and then employing transverse bolts 52 and nuts 53 to draw the portions of the jaw together into a clamping engagement. As clearly shown in Fig. 6, each of the bolts 52 is provided with a head which is let into a socket in one side of the jaw and at the other end it is threaded for the reception of the nut 53. When it is desired to adjust the jaws 16 and 17 with reference to the master jaws 14 and 15 it is only necessary to loosen up the nuts 53 and then by means of a suitable tool turn the adjusting screws 43 and 44 to the desired positions and then again tighten up the nuts 53. Ordinarily the opposing faces 54 and 55 of the adjustable jaws 16 and 17 do not come directly into engagement with the work but carry shoes or other pieces which do so engage the work. In the case illustrated these surfaces are provided with dovetail grooves 56 and 57 for the purpose of receiving dovetails upon the shoes or other parts that are used to directly engage the work.

It will be apparent that in carrying out my invention certain alterations and modifications may be made in the matter disclosed herein without departing from the spirit and scope of the invention. Consequently I have sought to cover all such alterations and modifications by the terms of the appended claim.

What I claim as new and desire to secure by Letters Patent of the United States, is:

A clutch comprising a head having opposed cavities of a given width, a hollow spindle secured to said head in the plane of said cavities, radially movable jaws slidably mounted on the face of said head, teeth upon the rear of said jaws, segments pivotally mounted within said cavities adjacent to said jaws, teeth upon said segments for cooperating with the teeth upon said jaws, arms on said segments extending rearwardly and terminating in rounded cam-engaging ends, said segments and segment arms being of substantially the same width as said cavities, a reciprocating member closely fitting within said spindle and longitudinally slotted at its forward end with a slot of substantially the same width as said cavities and segments, said slot providing space for the ends of said arms when said jaws are in open position, and a wedge-shaped cam member secured in the forward end of said slot and having forwardly diverging cam faces terminating in parallel cam faces, said diverging and parallel faces cooperating with the cam-engaging ends of said segment arms, said wedge-shaped cam member being of substantially the same width as said slot and cavities and extending in the vicinity of said parallel faces beyond the confines of said slot into said cavities whereby said member by engaging the walls of said cavities prevents rotation of said reciprocating member and maintains said slot in alignment with said cavities and whereby said member by engaging said spindle limits the rearward movement of said reciprocating member only after the cam-engaging ends of said segment arms have passed from said divergent faces to said parallel faces.

In testimony whereof, I hereunto subscribe my name this 26th day of August, A. D. 1920.

ROBERT GRACE.